Nov. 18, 1952            C. GUZZI            2,618,494

REAR SUSPENSION OF MOTOR SCOOTERS

Filed Nov. 2, 1950            2 SHEETS—SHEET 1

INVENTOR.
CARLO GUZZI

BY

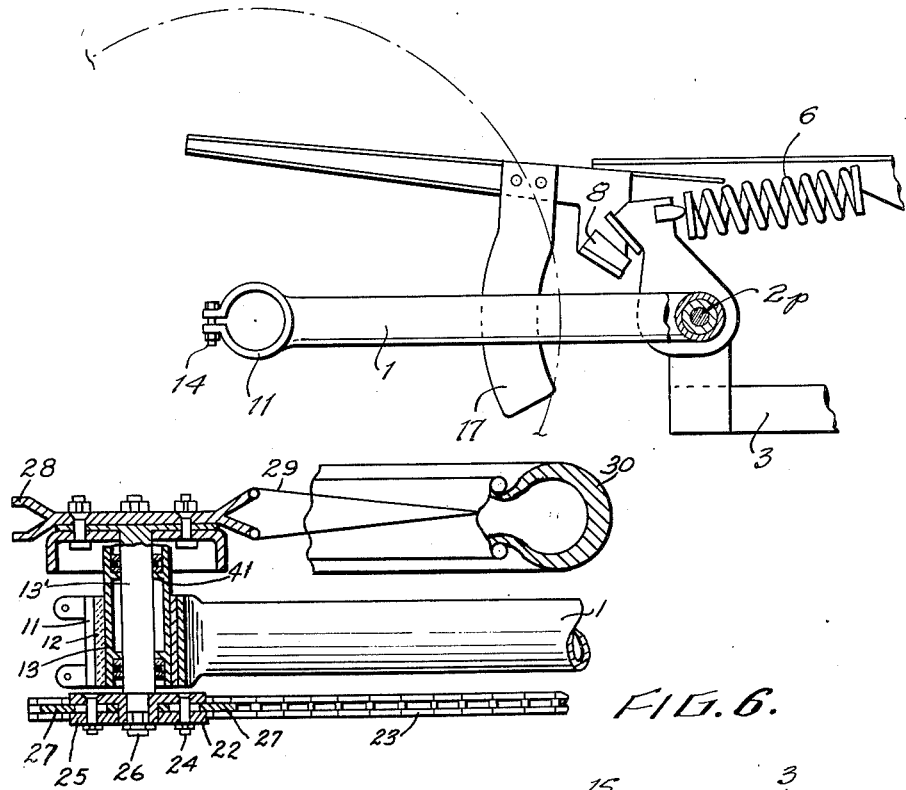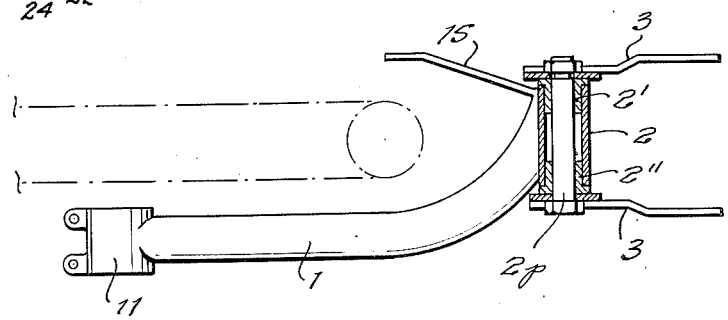

Patented Nov. 18, 1952

2,618,494

UNITED STATES PATENT OFFICE 2,618,494

REAR SUSPENSION OF MOTOR SCOOTERS

Carlo Guzzi, Mandello Lario (Como), Italy, assignor to Moto Guzzi Soc. p. Az., Genoa, Italy Application November 2, 1950, Serial No. 193,629
In Italy July 28, 1950

3 Claims. (Cl. 280—283)

This invention relates to the rear suspension of a motor scooter or the like.

According to the present invention the rear suspension comprises a single curved arm of circular cross section welded to a tube section incorporating a pivotal mounting carried by two supports of the motor scooter framework.

One form of such suspension and other subsidiary features of the present invention are illustrated in the accompanying drawings, in which:

Fig. 4 is a side elevation of the rear suspension similar to Fig. 1 showing the fork fixing pivot and the motor carrying socket.

Fig. 5 is a plan view like Fig. 2 showing the bushes and the fixing pivot.

Fig. 6 is a sectional view of the rear wheel spindle, the rotatble bush and the chain engaging said wheel.

Figure 1:
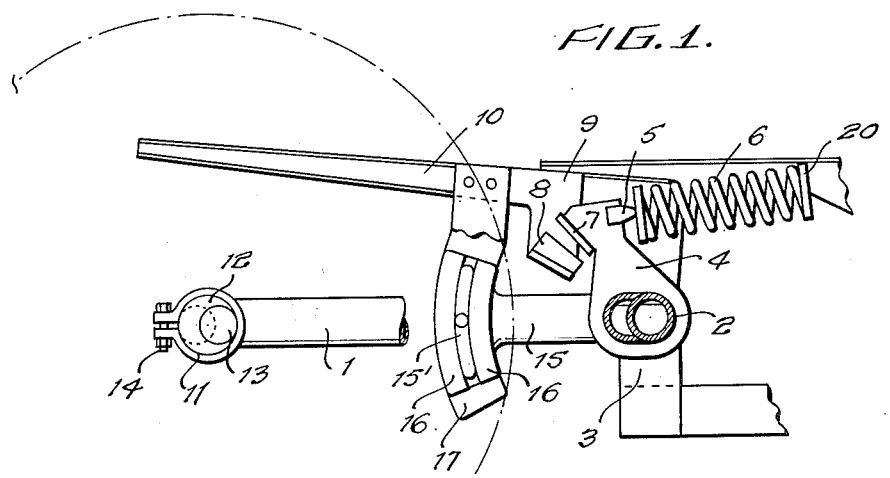
Fig. 1 is a side elevation, partly in section, of the rear suspension as viewed from the right hand side of the motor scooter.
Figure 2:
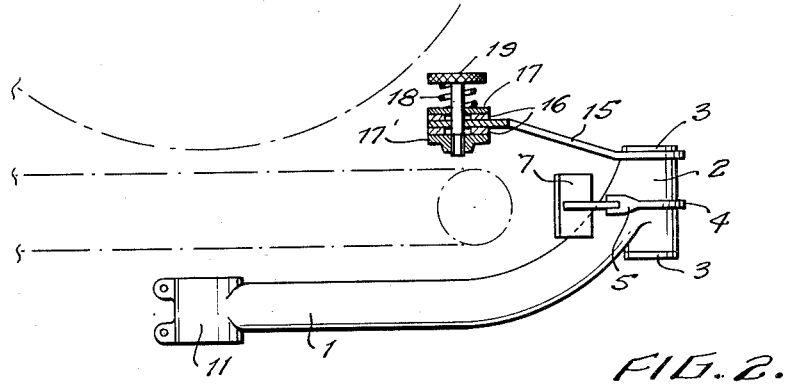
Fig. 2 is a plan view, partly in section, corresponding to Fig. 1.
Figure 3:
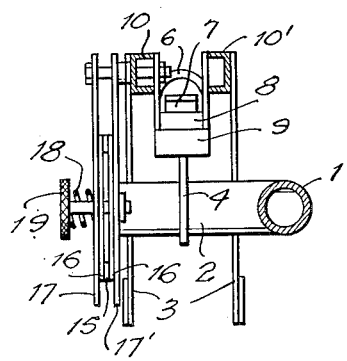
Fig. 3 is a rear elevation, partly in section, also corresponding to Fig. 1.

As illustrated, the rear suspension according to the present invention comprises essentially a tubular curved arm 1 welded to a tube section 2 within which is mounted the bushes 2′ and 2″ and the fixing pivot 2p by means of which the suspension is carried by a pair of supports or sockets 3 forming part of the motor scooter frame. A plate 4 is welded to the tube section 2 and its upper end carries a projection 5 which presses on the rear end of a spring shock absorber 6. The latter is secured to a plate 20 attached to the motor scooter frame. The rear of plate 4 is provided with a wing 7 which at the limit of travel strikes against a resilient buffer 8 restricting the recoil movement of the suspension. The buffer 8 is supported by a plate 9 attached to two rear arms 10, 10′ of the framework. A circular housing 11 welded to the rear end of arm 1 contains a rotatable bush 12 having an eccentric bore 13 within which is mounted the rear wheel spindle 13′. By rotating the bush 12 in housing 11, the position of bore 13, in which is secured a trunnion pivot 21 is adjusted with respect to the frame. The spindle 13′ supports at one end a flange member 28 to which the wheel 30 is secured by means of spokes 29, and at the other end a pair of discs 25 between which a rubber member 22 is clamped by bolts and nuts 24. The discs 25 are secured to the spindle 13′ by a nut 26. A chain wheel 27 is mounted on the unit 22, 25 so that the chain 23 may be adjusted by rotating the bush 12. Thereupon, the bush 12 is locked in the split housing 11 by tightening up the nuts 14.

Since the suspension comprises a single arm 1, the rubber member 22 can be readily replaced if damaged. By making the arm 1 circular in cross section, it is specially resistant to torsional stresses.

A rearwardly extending arm 15 secured to tube section 2 is formed with an extended area lined on both sides with two lining strips 16. These strips are disposed between plates 17, 17′ secured to the left hand rear member of the frame 10. The pressure between the strips 16 and plates 17, 17′ is adjustable, through the very flexible spring 18, by means of a milled head 19 integral with a screw pivoted in one of the plates 17, 17′. The extended part of arm 15, forming the resilient device, is provided with an arcuate slot 15, 15′ which permits free movement of the screw as arm 15 oscillates.

I claim:

1. A rear suspension for a motor scooter or the like, comprising a single curved arm of circular cross-section, a tube section to which the forward end of said arm is welded, a pivotal mounting incorporated in said tube section, framework supports for said pivotal mounting, a shock-absorbing device carried by said tube section, said device comprising an arm having a rearward extended area formed with an arcuate slot, lining strips on opposite sides of said extended area, a rearwardly extending arm of the motor scooter framework, plates carried by said latter arm and between which said lining strips are disposed, and means for adjusting the pressure between said strips and associated plates, a circular housing welded to the rear end of said shock absorber arm, a rotatable bush mounted within said housing and having an eccentric bore, a rear wheel spindle secured within said bore, and a chain engaging said wheel, whereby upon rotation of said bush the position of said bore and thus adjustment of the chain is achieved.

2. A rear supsension according to claim 1, wherein the means for adjusting the pressure between said strips and plates comprises a headed screw engaged in one of said plates, a very flexible spring associated with said headed screw, whereby upon oscillation of said shock obsorber arm said headed screw rides in said arcuate slot in said arm.

3. A rear suspension for a motor scooter or the like, comprising a single curved arm of circular cross-section; a tube section to which the forward end of said arm is welded; a pivotal mounting incorporated in said tube section; framework supports for said pivotal mounting; a plate welded to said tube section and extended rearwardly to form a wing; a resilient buffer adapted to be engaged by said wing at its limit of travel, whereby the extent of recoil of the suspension is controlled; a circular housing welded to the rear end of said shock absorber arm; a rotatable bush mounted within said housing and having an eccentric bore; a rear wheel spindle secured within said bore; a chain engaging said wheel, whereby upon rotation of said bush the position of said bore and thus adjustment of the chain is achieved; and a shock-absorbing device carried by said tube section, and including an arm having a rearward extended area formed with an arcuate slot, lining strips on opposite sides of said extended area, a rearwardly extending arm of the motor scooter framework, plates carried by said latter arm and between which said lining strips are disposed, and means for adjusting the pressure between said strips and associated plates.

CARLO GUZZI.

REFERENCES CITED

The following references are of record in the file of this patent:

UNITED STATES PATENTS

| Number | Name | Date |
|---|---|---|
| 604,294 | Bernson | May 17, 1898 |
| 2,082,147 | Bryant | June 1, 1937 |
| 2,522,867 | Goldammer et al. | Sept. 19, 1950 |

FOREIGN PATENTS

| Number | Country | Date |
|---|---|---|
| 254,698 | Switzerland | Dec. 16, 1948 |
| 767,510 | France | May 1, 1934 |